United States Patent
Alexander et al.

(10) Patent No.: US 10,233,571 B1
(45) Date of Patent: Mar. 19, 2019

(54) MULTI-FUNCTIONAL TEXTILES WITH INTEGRATED SENSING AND CONTROL ELEMENTS

(71) Applicant: GM Global Technology Operations LLC, Detroit, MI (US)

(72) Inventors: Paul W. Alexander, Ypsilanti, MI (US); Dorel M. Sala, Troy, MI (US); Nancy L. Johnson, Northville, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 4 days.

(21) Appl. No.: 15/854,254

(22) Filed: Dec. 26, 2017

(51) Int. Cl.
*H04B 3/36* (2006.01)
*D03D 1/00* (2006.01)
*G06F 3/01* (2006.01)
*G06F 3/044* (2006.01)

(52) U.S. Cl.
CPC ........... *D03D 1/0088* (2013.01); *G06F 3/011* (2013.01); *G06F 3/016* (2013.01); *G06F 3/044* (2013.01); *D10B 2401/18* (2013.01)

(58) Field of Classification Search
None
See application file for complete search history.

(56) References Cited

U.S. PATENT DOCUMENTS

| 8,362,882 B2 | 1/2013 | Heubel et al. |
| 9,521,885 B2 | 12/2016 | Weber et al. |
| 2002/0121146 A1* | 9/2002 | Manaresi ................. B63H 9/06 73/862.68 |
| 2006/0258247 A1* | 11/2006 | Tao ....................... D03D 1/0088 442/301 |
| 2017/0029985 A1* | 2/2017 | Tajitsu ................... D03D 15/00 |
| 2017/0249033 A1* | 8/2017 | Podhajny ................ G06F 3/044 |
| 2017/0322674 A1* | 11/2017 | Rosenberg .......... G06F 3/03545 |

\* cited by examiner

*Primary Examiner* — Julie B Lieu
(74) *Attorney, Agent, or Firm* — Quinn IP Law

(57) ABSTRACT

A textile assembly includes a knitted or woven textile panel of non-conductive fibers, and defines a first delimited area. A first conductive filament is knitted or woven into the textile panel in the first delimited area, and is arranged to form an electronic device, such as a sensor or a switch, in the first delimited area. The textile assembly may further include a third conductive filament that is knitted or woven into the textile panel in a second delimited area. The third conductive filament is arranged to form a second electronic device, such as a sensor or a switch, in the second delimited area. A controller may use a signal from the first electronic device and the second electronic device to execute a function, such as generate a pressure map of the textile panel.

17 Claims, 4 Drawing Sheets

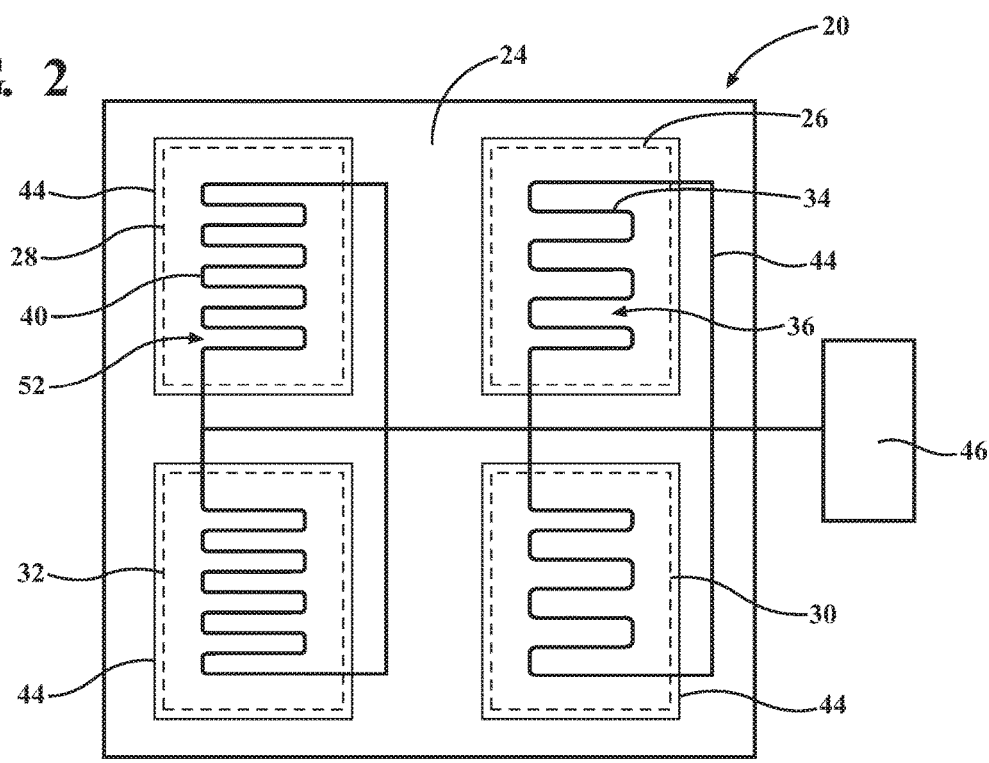
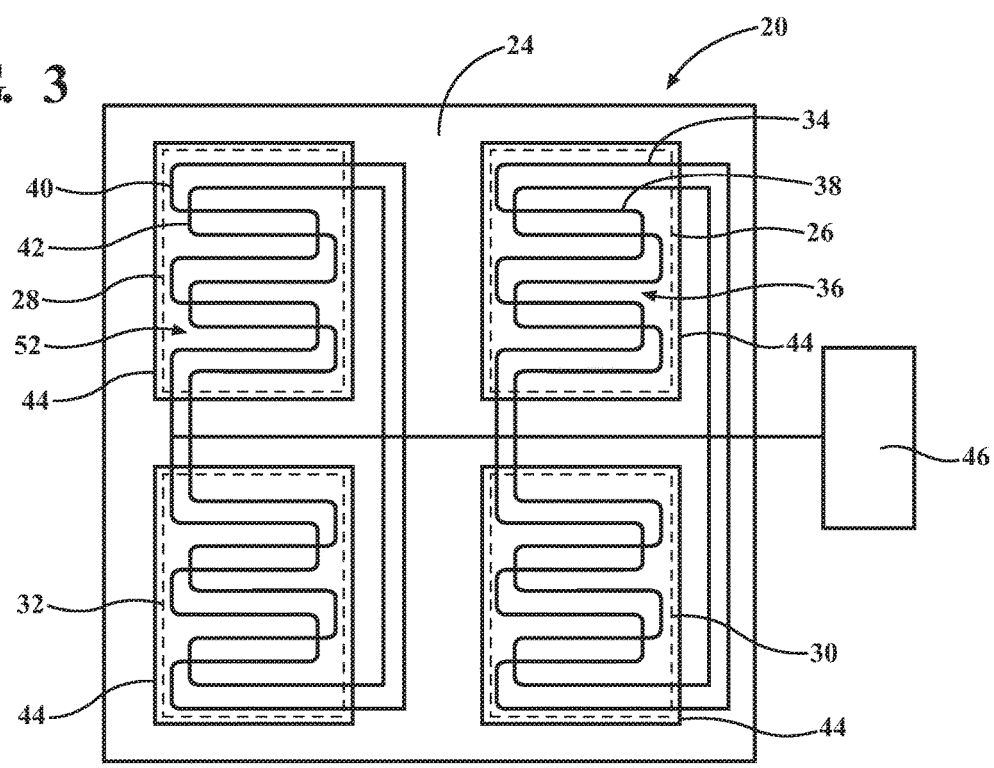

MULTI-FUNCTIONAL TEXTILES WITH INTEGRATED SENSING AND CONTROL ELEMENTS

INTRODUCTION

The disclosure generally relates to a fabric panel assembly.

Fabrics may be made from woven or knitted fibers, and may be incorporated into a wide variety of applications. For some applications, it is desirable to cover or conceal switches and/or sensors with a fabric. Discrete electronic items, such as sensors and/or switches, have also been placed in pockets or pouches formed on an underside of a fabric.

SUMMARY

A textile assembly is provided. The textile assembly includes a textile panel and a first conductive filament. The textile panel includes a knitted or woven fabric of non-conductive fibers, and defines a first delimited area. The first conductive filament is attached to the textile panel, and is arranged to form a first electronic device in the first delimited area. The first conductive filament is woven or knitted into the textile panel in the first delimited area. The first electronic device may include, but is not limited to, a switch or a sensor.

In one embodiment, the textile assembly further includes a second conductive filament that is attached to the textile panel. The second conductive filament is arranged in combination with the first conductive filament to form the first electronic device. The second conductive filament is woven or knitted into the textile panel in the first delimited area.

In one embodiment of the textile assembly, the first conductive filament and the second conductive filament are arranged relative to each other to form a first resistance sensor. In another embodiment of the textile assembly, the first conductive filament and the second conductive filament are arranged relative to each other to form a first capacitance sensor.

In one embodiment of the textile assembly, the textile panel includes a second delimited area. A third conductive filament is attached to the textile panel and arranged to form one of a second sensor or a second switch in the second delimited area. The third conductive filament is woven or knitted into the textile pane within the second delimited area. The textile assembly may further include a fourth conductive filament that is attached to the textile panel. The fourth conductive filament is arranged in combination with the third conductive filament to form one of the second sensor of the second switch. The fourth conductive filament is woven or knitted into the textile panel in the second delimited area.

In one aspect of the disclosure, the textile assembly includes a controller that is connected to each of the first conductive filament and the third conductive filament. The controller is operable to receive a signal from the first conductive filament and the third conductive filament, and generate a pressure map of the textile panel using the signal from the first conductive filament in the first delimited area, and the third conductive filament in the second delimited area. The controller may also be connected to and in communication with the second conductive element of the first delimited area, and the fourth conductive element of the second delimited area.

In one aspect of the disclosure, the textile assembly may include an electrical shield attached to the textile panel. The electrical shield surrounds the first delimited area for electrically insulating the first delimited area from other portions of the textile panel.

In one aspect of the disclosure, the conductive filaments, including the first conductive filament, the second conductive filament, the third conductive filament, and the fourth conductive filament, include one of a silver fiber, a copper fiber, a steel fiber, a capacitive fiber, a piezoelectric fiber, or a polymeric fiber doped with a conductive filler material.

In one aspect of the disclosure, the textile panel may include a first layer and an opposing second layer. The first conductive filament is attached to the first layer and arranged for generating a magnetic field. A reactive element is attached to the second layer, and is disposed opposite the first conductive filament. Electrical excitation of the first conductive filament and the reactive element alternatingly attracts and repels the first conductive filament and the reactive element generating a vibratory haptic signal. The reactive element may include one of a permanent magnet or a conductive element arranged for generating a magnetic field, and including a mass or region of textile constructed of a more dense yarn.

In one aspect of the disclosure, the first conductive filament may include a piezo fiber. The piezo fiber includes a core of a conductive material, an intermediate layer of a piezoelectric material disposed about and encapsulating the core, and an outer layer of a conductive material disposed about and encapsulating the intermediate layer.

A textile panel is also provided. The textile panel includes a first layer, a second layer, and a central filament. The first layer includes and is formed from a conductive fiber, and is either a knitted or woven fabric. The second layer is disposed opposite the first layer. The second layer includes and is formed from a conductive fiber. The second layer is either a knitted or woven fabric. The central filament includes and is manufactured from a piezoelectric material, and is disposed between the first layer and the second layer.

In one embodiment of the textile panel, the central filament includes a piezo material and a central core of a conductive material. The central core is connected to a positive electrical lead. The first layer and the second layer are connected to each other and to a negative electrical lead.

In another embodiment of the textile panel, the central filament includes a piezo material, the first layer is connected to a positive electrical lead, and the second layer is connected to a negative electrical lead.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic plan view of a first embodiment of the textile assembly.

FIG. 3 is a schematic plane view of a second embodiment of the textile assembly.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
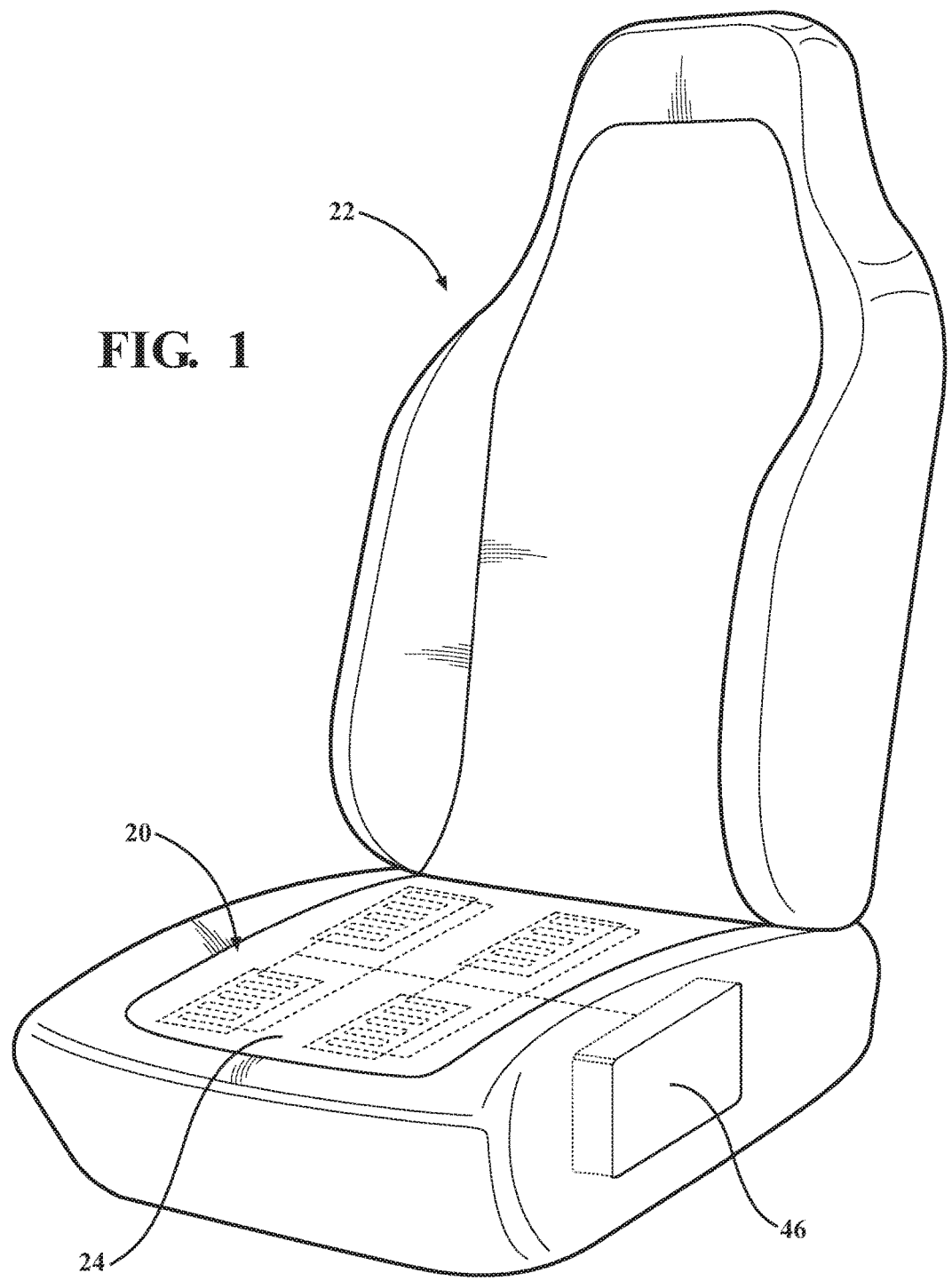
FIG. 1 is a schematic perspective view of a seat using a textile assembly as a seat covering.

Referring to the FIGS., wherein like numerals indicate like parts throughout the several views, a textile assembly is generally shown at 20 in FIG. 1. The textile assembly 20 may be incorporated into some other structure. For example, the textile assembly 20 may be used as an upholstery covering for a seat 22, such as but not limited to a vehicular seat 22, a couch, a chair, etc., or a trim covering, such as but not limited to a trim piece for a door of a vehicle, an appliance, etc.

Referring to FIGS. 2-3, the textile assembly 20 includes a textile panel 24. The textile panel 24 includes a knitted or woven fabric. The textile panel 24 includes and is manufactured from non-conductive fibers. The non-conductive fibers may include natural or synthetic fibers. The textile panel 24 may be woven or knitted using a suitable process understood by those skilled in the art. The specific process used to weave or knit the textile panel 24, and the specific properties of the non-conductive fibers used to manufacture the textile panel 24 are not pertinent to the teachings of this disclosure, and are therefore not described in detail herein.

The textile panel 24 includes at least a first delimited area 26, but may include other delimited areas. For example, as shown in FIGS. 2-3, exemplary embodiments of the textile panel 24 are shown with the first delimited area 26, a second delimited area 28, a third delimited area 30, and a fourth delimited area 32. The textile panel 24 may include a number of delimited areas that differs from the exemplary embodiments shown and described herein. Each of the delimited areas is a zone or region of the textile panel 24, and may be sized and shaped for a specific purpose and characteristic.

A first conductive filament 34 is attached to the textile panel 24. The first conductive filament 34 is woven or knitted into the textile panel 24 in the first delimited area 26. The first conductive filament 34 is arranged to form a first electronic device 36 in the first delimited area 26, such as a sensor or a switch. Depending on the intended type/purpose/function of the first electronic device 36, the textile assembly 20 may further include a second conductive filament 38 attached to the textile panel 24. The second conductive filament 38 is woven or knitted into the textile panel 24 in the first delimited area 26, and is arranged in combination with the first conductive filament 34 to form the first electronic device 36.

As noted above, the first conductive filament 34 (and the second conductive filament 38 if included), may be arranged in the first delimited area 26 in a manner to form the first electronic device 36, e.g., either a switch or a sensor. For example, referring to FIG. 2, the first conductive filament 34 is arranged so that the first electronic device 36 operates as a self-capacitance sensor. As is understood by those skilled in the art, a self-capacitance sensor may use an electrical charge from a person as part of a capacitance sensor. When the person comes in close proximity to the first conductive filament 34, the electrical charge from the person and the first conductive filament 34 cooperate to form a capacitance sensor. In other embodiments, the textile panel 24 may be equipped with the second conductive filament 38, and have each arranged relative to each other so that the first electronic device 36 operates as a parallel plate capacitance sensor. As such, the first conductive filament 34 and the second conductive filament 38 each form a respective plate of a parallel plate capacitor. For example, the first filament and the second filament may be arranged in opposing layers to form the respective plates of the parallel plate capacitor.

Referring to FIG. 3, the textile assembly 20 is embodied to include both the first conductive filament 34 and the second conductive filament 38 arranged relative to each other so that the first electronic device 36 forms a resistance sensor. The first conductive filament 34 and the second conductive filament 38 may be arranged in a manner that causes the electrical resistance between the first conductive filament 34 and the second conductive filament 38 to change in response to pressure. For example, the first conductive filament 34 and the second conductive filament 38 may be arranged to form a mat, or in a pattern that allows the resistance to change as the first conductive filament 34 and the second conductive filament 38 are pressed closer together when under pressure, such as when sat upon.

As noted above, the textile panel 24 may include multiple delimited areas. For example, the exemplary embodiments shown in FIGS. 2-3 include the first delimited area 26, the second delimited area 28, the third delimited area 30, and the fourth delimited area 32. Other embodiments may include more or less delimited areas. Each delimited area may be equipped with one or more respective conductive filaments to form a respective device, such as a switch or sensor, in that respective delimited area. For example, referring to FIG. 2, the second delimited area 28 is shown having a third conductive filament 40. The third conductive filament 40 is attached to the textile panel 24 and arranged to form a second electronic device 52, e.g., a sensor or a switch, in the second delimited area 28. The third conductive filament 40 is woven or knitted into the textile panel 24 within the second delimited area 28. Referring to FIG. 3, the second delimited area 28 is shown having a fourth conductive filament 42. The fourth conductive filament 42 is attached to the textile panel 24, and arranged in combination with the third conductive filament 40 to the second electronic device 52 in the second delimited area 28. The fourth conductive filament 42 is also woven or knitted into the textile pane within the second delimited area 28. While not explicitly described herein, it should be appreciated that the third delimited area 30 and the fourth delimited area 32 will each include respective conductive filaments to form respective devices therein.

In order to prevent electrical interference between the respective delimited areas, each respective delimited area may include an electrical shield 44. For example, referring to FIGS. 2-3, a respective electrical shield 44 is shown attached to the textile panel 24 and surrounding the first delimited area 26, the second delimited area 28, the third delimited area 30, and the fourth delimited area 32. The electrical shield 44 may include an insulated covering to cover a respective delimited area, or a fiber incorporated into the textile panel 24 surrounding a respective delimited area. The electrical shield 44 may include a material, shape, and configuration capable of electrically insulating one delimited area from the other adjacent delimited areas in the textile panel 24.

The textile assembly 20 may further include a controller 46. The controller 46 may be referred to as, but is not limited to, a vehicle controller 46, a control module, a control unit, a computer, etc. The controller 46 is operable to control the operation of the textile assembly 20, including any switches and/or sensors incorporated therein. The controller 46 may include a computer and/or processor, and include software, hardware, memory, algorithms, connections, sensors, etc., required to manage and control the operation of the textile assembly 20. It should be appreciated that the controller 46 may include a device capable of analyzing data from various sensors, comparing data, making decisions, and executing desired tasks.

The controller 46 includes a tangible non-transitory memory having computer executable instructions recorded thereon. The controller 46 further includes a processor that is operable to execute the executable instructions. The controller 46 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include a non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

Figure 4:
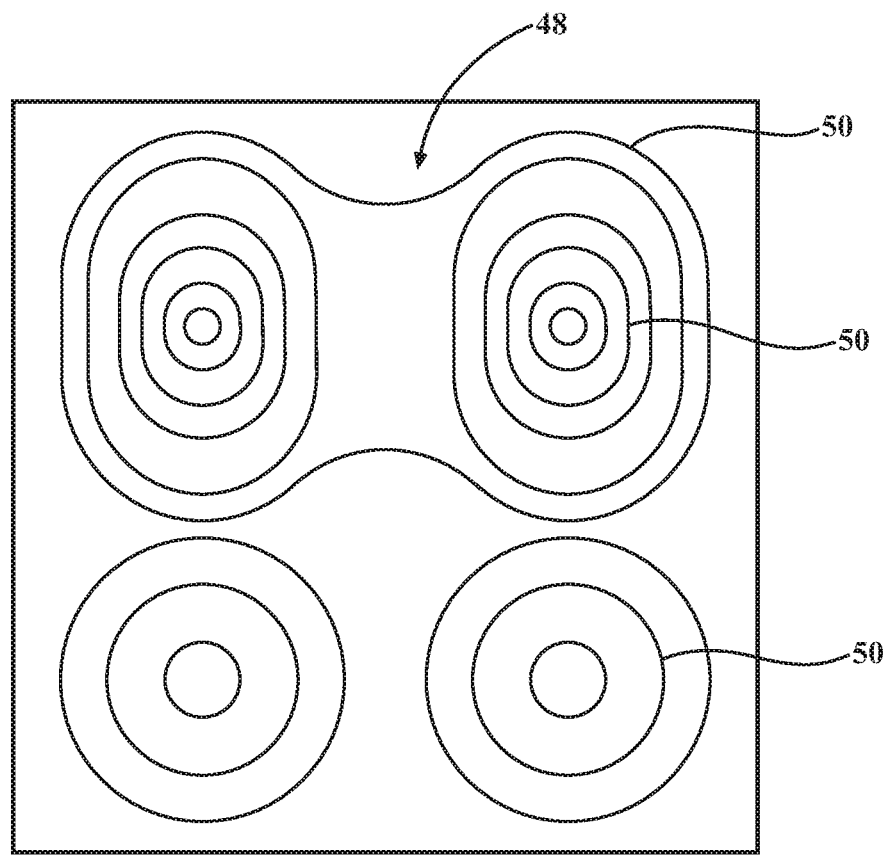
FIG. 4 is a schematic plane view of a pressure map of the textile assembly.

The controller 46 is connected to each of the respective conductive filaments of the textile panel 24. For example, referring to FIG. 2, the controller 46 is connected to the first conductive filament 34 and the third conductive filament 40. As shown in FIG. 3, the controller 46 is connected to the first conductive filament 34, the second conductive filament 38, the third conductive filament 40, and the fourth conductive filament 42. The controller 46 is operable to receive and/or send a signal from and/or to the respective conductive filaments. The controller 46 may include executable instructions enabling the controller 46 to receive data or a signal from the respective conductive filaments in the different respective delimited zones, and use that data or signal to generate a pressure map 48 of the textile panel 24. The pressure map 48 is generally shown in FIG. 4. For example, if the conductive filaments in the respective delimited areas are embodied as resistance sensors that measure a change in resistance in response to an applied pressure, the difference in the resistance between the different delimited areas may be used or plotted to generate the pressure map 48. Referring to FIG. 4, pressure gradient lines 50 indicate pressure. Areas of higher pressure include a higher density of pressure gradient lines 50, whereas areas of lower pressure include a lower density of pressure gradient lines 50.

The controller 46 may use the signal from the respective conductive filaments, in their respective delimited areas, to execute a desired function. For example, if the textile assembly 20 is embodied as a seat cover for a vehicular seat 22, such as shown in FIG. 1, and the conductive filaments and the controller 46 are configured to generate the pressure map 48 described above, then controller 46 may enable or disable an airbag or other device of the vehicle, depending upon the sensed pressure applied to the seat 22. In other embodiments, if the conductive filaments in their respective delimited areas are embodied as electrical switches, pressing on a respective delimited area may control the controller 46 to execute a specific function. For example, the textile assembly 20 may be embodied as a trim panel in a vehicle door, and the respective conductive filaments in the respective delimited areas may be control switches. Pressing the textile panel 24 in one of the respective delimited areas may control the controller 46 to execute a specific operation, such as raise or lower a window, move the seat 22, etc.

The conductive filaments of the textile assembly 20, i.e., the first conductive filament 34, the second conductive filament 38, the third conductive filament 40, and the fourth conductive filament 42, may each include and be manufactured from a suitable conductive fiber. For example, the conductive filaments may include a silver fiber, a copper fiber, a steel fiber, a capacitive fiber, a piezoelectric fiber, a polymeric fiber doped with a conductive filler material, or some other type of fiber capable of conducting an electrical current not specifically mentioned or described herein.

Figure 5:
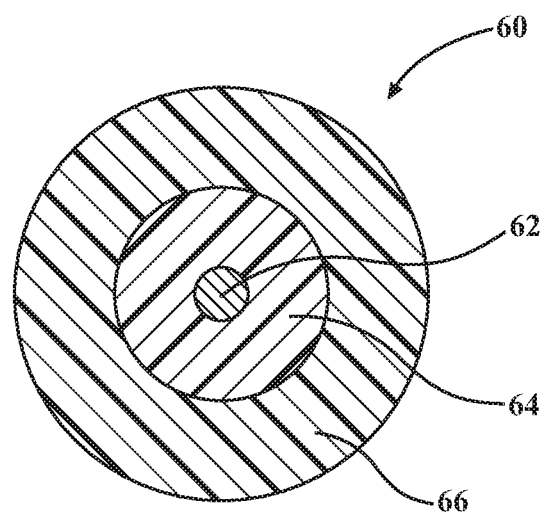
FIG. 5 is a schematic cross sectional view of a piezo fiber conductive filament for the textile assembly.

For example, an exemplary embodiment of a conductive filament is generally shown at 60 in FIG. 5. Referring to FIG. 5, the conductive filament 60 may include a piezo fiber including a core 62 of a conductive material. The conductive material of the core 62 may include a material capable of conducting an electrical current, such as copper, steel, gold, silver, etc. An intermediate layer 64 of a piezoelectric material is disposed about and encapsulates the core 62. The piezoelectric material of the intermediate layer 64 may include a material that is capable of creating an electrical charge when subjected to a mechanical stress. An outer layer 66 of a conductive material is disposed about and encapsulates the intermediate layer 64. The conductive material of the outer layer 66 may include a material capable of conducting an electrical current, such as copper, steel, gold, silver, etc.

Figure 6:
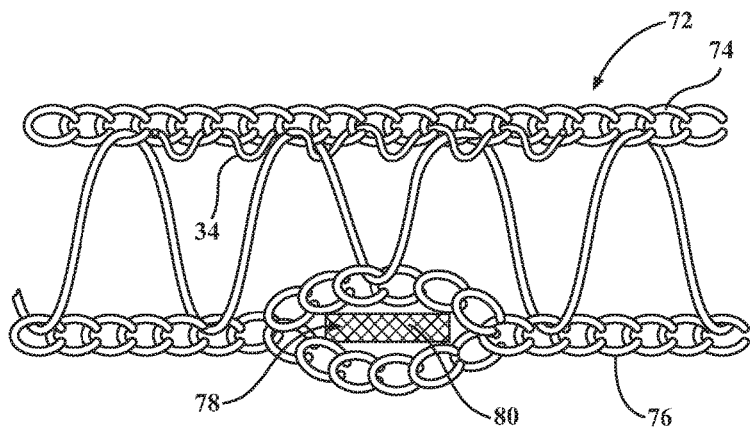
FIG. 6 is a schematic side view of a third embodiment of the textile assembly configured for generating a haptic signal.

Referring to FIG. 6, and alternative embodiment of the textile assembly is generally shown at 72. The textile assembly 72 includes a first layer 74 and an opposing second layer 76. The first layer 74 and the second layer 76 include and are manufactured from the non-conductive material described above. The first conductive filament 34 is attached to the first layer 74, and is arranged for generating a magnetic field in response to an electric current. A reactive element 78 is attached to the second layer 76. The reactive element 78 is disposed opposite the first conductive filament 34. The reactive element 78 may include, but is not limited to, one of a permanent magnet 80 or a conductive element arranged for generating a magnetic field in response to an electric current. The magnetic field from the reactive element 78 opposes the magnetic field from the first conductive filament 34. Repeated electrical excitation of the first conductive filament 34, and in some embodiments the reactive element 78, alternatingly attracts and repels the first conductive filament 34 and the reactive element 78, generating a vibratory haptic signal in the textile assembly 72. This haptic response may be used to communicate a message. For example, the textile assembly 72 may be embodied as a seat covering, and activated by the controller 46 to alert an occupant of the seat 22.

Figure 7:
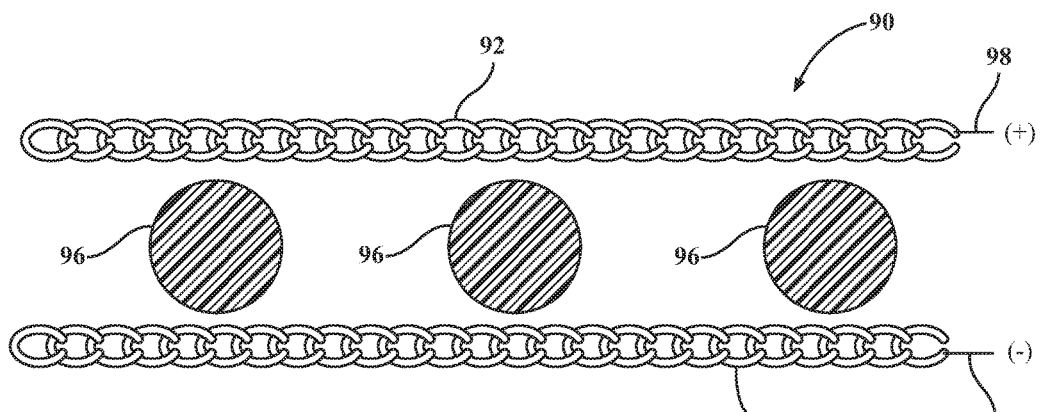
FIG. 7 is a schematic side view of a third embodiment of the textile assembly.
Figure 8:
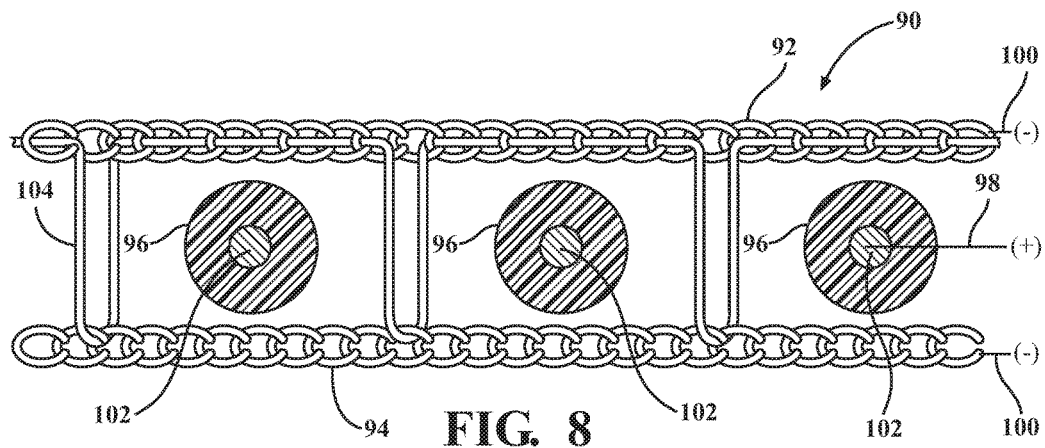
FIG. 8 is a schematic side view of a fourth embodiment of the textile assembly.

Referring to FIGS. 7-8, an embodiment of the textile assembly is generally shown at 90. The textile assembly 90 includes a first layer 92 of a conductive fiber. The first layer 92 is one of a knitted or woven fabric. The conductive fiber of the first layer 92 may include, but is not limited to, a steel fiber, a copper fiber, a silver fiber, a gold fiber, etc. The textile assembly 90 further includes a second layer 94 of a conductive fiber. The second layer 94 is disposed opposite to the first layer 92. The second layer 94 is also either a knitted or woven fabric. The conductive fiber of the second layer 94 may include, but is not limited to, a steel fiber, a copper fiber, a silver fiber, a gold fiber, etc. A central filament 96 of a piezoelectric material is disposed between the first layer 92 and the second layer 94. The piezoelectric material may include a material capable of creating an electrical current in response to mechanical stress.

Referring to FIG. 7, the first layer 92 is connected to a positive electrical lead 98, and the second layer 94 is connected to a negative electrical lead 100. The central filament 96 is disposed between the first layer 92 and the second layer 94. Referring to FIG. 8, the central filament 96 includes a central core 102 of a conductive material. The conductive material of the central core 102 may include, but is not limited to, a steel fiber, a copper fiber, a silver fiber, a gold fiber, etc. The central core 102 is connected to a positive electrical lead 98. The first layer 92 and the second layer 94 are connected to each other by a strand 104, and are each connected to a negative electrical lead 100.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A textile assembly comprising:
   a textile panel including a knitted or woven fabric formed from non-conductive fibers, wherein the textile panel includes a first delimited area;
   a first conductive filament attached to the textile panel and arranged to form a first electronic device in the first delimited area;
   wherein the first conductive filament is woven or knitted into the textile panel in the first delimited area; and
   an electrical shield attached to the textile panel and surrounding the first delimited area.

2. The textile assembly set forth in claim 1, further comprising a second conductive filament attached to the textile panel and arranged in combination with the first conductive filament to form the first electronic device.

3. The textile assembly set forth in claim 2, wherein the second conductive filament is woven or knitted into the textile panel in the first delimited area.

4. The textile assembly set forth in claim 3, wherein the first conductive filament and the second conductive filament are arranged relative to each other to form a first resistance sensor.

5. The textile assembly set forth in claim 3, wherein the first conductive filament and the second conductive filament are arranged relative to each other to form a first capacitance sensor.

6. The textile assembly set forth in claim 1, wherein the textile panel includes a second delimited area.

7. The textile assembly set forth in claim 6, further comprising a third conductive filament attached to the textile panel and arranged to form a second electronic device in the second delimited area, wherein the third conductive filament is woven or knitted into the textile pane within the second delimited area.

8. The textile assembly set forth in claim 7, further comprising a controller connected to each of the first conductive filament and the third conductive filament, wherein the controller is operable to receive a signal from the first conductive filament and the third conductive filament and generate a pressure map of the textile panel using the signal from the first conductive filament in the first delimited area and the third conductive filament in the second delimited area.

9. The textile assembly set forth in claim 1, wherein the first conductive filament includes one of a silver fiber, a copper fiber, a steel fiber, a capacitive fiber, a piezoelectric fiber, or a polymeric fiber doped with a conductive filler material.

10. The textile assembly set forth in claim 1, wherein the textile panel includes a first layer and an opposing second layer, with the first conductive filament attached to the first layer and arranged for generating a magnetic field.

11. The textile assembly set forth in claim 10, further comprising a reactive element attached to the second layer and disposed opposite the first conductive filament, wherein electrical excitation of the first conductive filament and the reactive element alternatingly attracts and repels the first conductive filament and the reactive element relative to each other generating a vibratory haptic signal.

12. The textile assembly set forth in claim 11, wherein the reactive element is one of a permanent magnet or a conductive element arranged for generating the magnetic field.

13. The textile assembly set forth in claim 1, wherein the first conductive filament includes a piezo fiber including a core of a conductive material, an intermediate layer of a piezoelectric material disposed about and encapsulating the core, and an outer layer of a conductive material disposed about and encapsulating the intermediate layer.

14. A textile panel comprising:
   a first layer of a conductive fiber, wherein the first layer is one of a knitted or woven fabric;
   a second layer of a conductive fiber disposed opposite to the first layer, wherein the second layer is one of a knitted or woven fabric;
   a central filament formed from a piezoelectric material disposed between the first layer and the second layer;
   wherein the first layer and the second layer are connected to form a first delimited area; and
   an electrical shield attached to the first layer and the second layer, and surrounding the first delimited area.

15. The textile panel set forth in claim 14, wherein the first layer is connected to a positive electrical lead, and the second layer is connected to a negative electrical lead.

16. The textile panel set forth in claim 14, wherein the first layer and the second layer are connected to each other and to a negative electrical lead.

17. The textile panel set forth in claim 16, wherein the central filament includes a central core formed from a conductive material connected to a positive electrical lead.

* * * * *